No. 629,052.

R. TAYLOR, Jr.
TRAVELING FLAT CARDING ENGINE.
(Application filed Jan. 4, 1899.)

Patented July 18, 1899.

(No Model.)

WITNESSES:

INVENTOR
Robert Taylor Jr.
BY Richardson

ATTORNEYS

UNITED STATES PATENT OFFICE.

ROBERT TAYLOR, JR., OF OLDHAM, ENGLAND.

TRAVELING-FLAT CARDING-ENGINE.

SPECIFICATION forming part of Letters Patent No. 629,052, dated July 18, 1899.

Application filed January 4, 1899. Serial No. 701,144. (No model.)

*To all whom it may concern:*

Be it known that I, ROBERT TAYLOR, Jr., a subject of the Queen of Great Britain, residing at Oldham, in the county of Lancaster, England, have invented certain new and useful Improvements in Traveling-Flat Carding-Engines, (for which I have made application for Letters Patent in Great Britain, No. 14,750, bearing date July 5, 1898,) of which the following is a specification.

My invention relates to improvements in traveling-flat carding-engines; and the object of my improvement is to enable any flat to be disconnected from the traveling chains without disturbing or displacing the latter. In the ordinary way each flat is pivoted at each end upon one of the pins which pass through the bushes which connect together the links of the chain; but according to my improvements I separately pivot or connect each flat to the links of the chains in such a way that a flat can be readily disconnected from or attached to the chains without interfering with the pins which hinge the links together.

Figure 1:
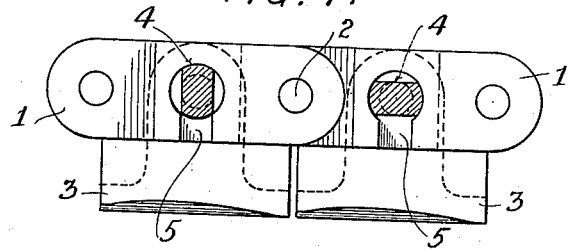
Figure 2:
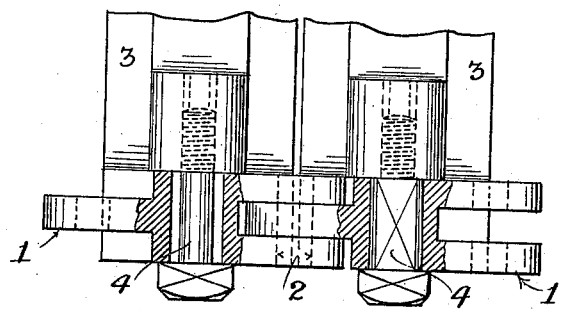

In the accompanying sheet of drawings, Figure 1 is a side elevation, and Fig. 2 a plan, both partly sectional, of part of one of the chains and two of the flats of a traveling-flat carding-engine to which my improvements are applied.

In the drawings, 1 denotes the links of the traveling chain, 2 the pins which pivot the links together, and 3 the traveling flats.

In the construction illustrated I employ a stud or bolt 4, screwed horizontally into each end of the flat 3, and with two flattened sides adapted to pass through a slot 5 into a hole formed to receive it in the solid part of the link 1. When in this said hole, the stud 4 is turned a quarter-turn into the position shown on the right-hand side of Fig. 1 to prevent its withdrawal through the slot 5 leading to the hole; but by turning the stud 4 a quarter-turn into the position shown on the left-hand side of Fig. 1 the stud can be withdrawn from the link 1 and the flat released from the chain.

Having now particularly described and ascertained the nature of my said invention and in what manner the same is to be performed, what I claim, and desire to secure by Letters Patent of the United States, is—

1. In a carding-engine, the traveling chains, the flats and a locking connection between each flat and the chains, said connection being independent of the link-pivots and arranged to allow of the connecting or disconnecting of any flat from the chains without parting the chain, substantially as described.

2. In a carding-engine the combination with the traveling chains, of the horizontal studs 4 screwed into the ends of the flats 3, said studs being formed with two flattened sides adapted to pass through the slot 5 leading to a hole in the link, substantially as set forth.

In witness whereof I have hereunto set my hand in presence of two witnesses.

ROBERT TAYLOR, JR.

Witnesses:
H. B. BARLOW,
S. W. GILLETT.